(12) United States Patent
Omarova et al.

(10) Patent No.: US 12,533,421 B2
(45) Date of Patent: Jan. 27, 2026

(54) METHODS FOR MAKING MULTILAYERED VESICLES

(71) Applicants: The Administrators of the Tulane Educational Fund, New Orleans, LA (US); Board of Supervisors of Louisiana State Univeristy and Agricultural and Mechanical College, Baton Rouge, LA (US)

(72) Inventors: Marzhana Omarova, Cambridge, MA (US); Vijay T. John, Destrehan, LA (US); Donghui Zhang, Baton Rouge, LA (US)

(73) Assignees: The Administrators of the Tulane Educational Fund, New Orleans, LA (US); Board of Supervisors of Louisiana State Univeristy and Agricultural and Mechanical College, Baton Rouge, LA (US)

( * ) Notice: Subject to any disclaimer, the term of this patent is extended or adjusted under 35 U.S.C. 154(b) by 378 days.

(21) Appl. No.: 17/673,063

(22) Filed: Feb. 16, 2022

(65) Prior Publication Data

US 2022/0257791 A1    Aug. 18, 2022

Related U.S. Application Data

(60) Provisional application No. 63/149,697, filed on Feb. 16, 2021.

(51) Int. Cl.
*A61K 47/69*    (2017.01)
*A61K 9/1272*   (2025.01)
*A61P 35/00*    (2006.01)

(52) U.S. Cl.
CPC ........ *A61K 47/6911* (2017.08); *A61K 9/1272* (2013.01); *A61P 35/00* (2018.01)

(58) Field of Classification Search
CPC A61K 47/6911; A61K 9/1272; A61K 9/1271; A61P 35/00
See application file for complete search history.

(56) References Cited

U.S. PATENT DOCUMENTS

2019/0185622 A1    6/2019  Zhang et al.

FOREIGN PATENT DOCUMENTS

WO    87/04592     *  8/1987
WO    2017/209805  * 12/2017

OTHER PUBLICATIONS

Omarova et al., Hydrophobe Containing Polypeptoids Complex with Lipids and Induce Fusogenesis of Lipid Vesicles, J. Phys. Chem. B, 125:3145-3152 (2021).

Zhang et al., Amphiphilic Polypeptoids Serve as the Connective Glue to Transform Liposomes into Multilamellar Structures with Closely Spaced Bilayers, Langmuir, 33(11):2780-9 (2017) [abstract only].

* cited by examiner

*Primary Examiner* — Aradhana Sasan
(74) *Attorney, Agent, or Firm* — MARSHALL, GERSTEIN & BORUN LLP

(57) ABSTRACT

The disclosure relates to multilayered vesicles, methods for forming multilayered vesicles, and drug delivery complexes including multilayered vesicles. The multilayered vesicles can be formed by adding hydrophobe containing polypeptoid (HCP)-lipid complexes to unilamellar vesicles such as liposomes in an amount effective to form multilayered vesicles. The HCP-lipid complexes can be produced by mixing a hydrophobe containing polypeptoid (HCP) with a first set of unilamellar vesicles. The unilamellar vesicles and/or drug delivery complexes can include various cargoes for delivery, such as water-soluble cargoes, hydrophobic cargoes, etc.

23 Claims, 10 Drawing Sheets

METHODS FOR MAKING MULTILAYERED VESICLES

CROSS REFERENCE TO RELATED APPLICATION

Priority is claimed to U.S. Provisional Application No. 63/149,697 (filed Feb. 16, 2021), which is incorporated herein by reference in its entirety.

STATEMENT REGARDING FEDERALLY SPONSORED RESEARCH OR DEVELOPMENT

This invention was made with Government support under contracts 1804861 and 1805608 awarded by the National Science Foundation. The Government has certain rights in the invention.

BACKGROUND

Synthetic lipid vesicles or liposomes are a useful and convenient platform for research on model cell membranes. Liposomes have one or more lipid bilayers that can enclose one or more aqueous internal spaces. A compound to be delivered can be entrapped either in the aqueous internal compartments, in the lipid bilayer(s), or both, depending on the nature of the compound. Water-soluble compounds are readily entrapped in the aqueous internal space(s), while compounds that are poorly water soluble and hydrophobic compounds tend to be incorporated into the lipid bilayer(s). Liposomes offer a number of advantages in drug delivery applications, such as a simple and scalable method of preparation and designability suitable for encapsulation of small molecules and nucleic acids. A number of drug formulations use liposomes or lipid-based nanoparticles are currently in clinical trials, with a few approved for medical use in drug delivery. Multilamellar lipid vesicles formed through high energy shear are well documented, but the formation of such multilamellar vesicles is imprecise and it is likely that fragile biomolecules in the vesicles are degraded through such shear effects. Alternative methods are needed so that more robust, layered vesicles with multiple drugs can be prepared in a facile manner for a variety of drug delivery applications. These needs and other needs are satisfied by the present disclosure.

SUMMARY

In one aspect, the disclosure relates to a method of forming multilayered vesicles, the method comprising adding a plurality of hydrophobe containing polypeptoid (HCP)-lipid complexes to a plurality of unilamellar vesicles in an amount effective to form multilayered vesicles.

In a refinement, the unilamellar vesicles are liposomes. The liposomes can have an average diameter of about 100 nm.

In a refinement, the amount of unilamellar vesicles effective for forming multilayered vesicles is an amount that provides a 2:1 volume ratio of unilamellar vesicles to HCP-lipid complexes.

In a refinement, the HCP-lipid complexes are produced by mixing a plurality of HCP's with a first set of unilamellar vesicles, for example at a ratio of about 2:1 by weight. The plurality of unilamellar vesicles to which the HCP-lipid complexes are added can be a second set of unilamellar vesicles. In a further refinement, the HCP-lipid complexes comprise about 0.25 wt % lipid and 0.5 wt % HCP.

In refinements, the multilayered vesicles have a larger diameter than the unilamellar vesicles. The multilayered vesicles according to the disclosure can comprise one or more discontinuous layers.

In a refinement, the unilamellar vesicles are loaded with a cargo. In a further refinement, the cargo is retained upon formation of the multilayered vesicles according to the present disclosure. In a further refinement, the cargo is a water-soluble drug.

In a refinement, the HCP is a random copolymer of N-methoxyethyl glycine units and N-decyl glycine units. In a further refinement, the HCP comprises about 100 monomer units.

In a refinement, the HCP-lipid complex comprises a plurality of self-assembled HCPs, wherein the complex is formed by a physical association of the HCP with a lipid or a lipid bilayer fragment of a liposome. In a further refinement, the HCPs comprise a polyamide backbone comprising a random copolymer of two or more different types of repeat units, wherein one or more of the repeat units comprise a nitrogen atom in the backbone having a hydrophobic substituent attached thereto.

In a refinement, the HCP-lipid complexes have a length of about 10 nm.

In another aspect, the disclosure relates to a drug delivery complex comprising a multilayered vesicle comprising a core surrounded by multiple lipid bilayers, wherein at least a portion of the layers are discontinuous lipid bilayers.

In a refinement, the drug delivery complex is loaded with a first cargo, wherein the first cargo is water-soluble.

In a refinement, the drug delivery complex comprises one or more additional cargoes which are loaded in the lipid bilayers. In refinements, the one or more additional cargoes are hydrophobic.

In another aspect, the disclosure relates to a multilayer vesicle formed by methods disclosed herein.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 2, panel a is a diagram illustrating a mechanism for liposome disruption by HCPs. Fresh liposomes 1 are mixed with HCPs 2 to form a liposome-HCP complex 3 in which pendant hydrophobe groups of the HCP have inserted into the lipid bilayer. The hydrophobe insertion results in disruption of the lipid bilayer, breakdown of the liposome, and formation of HCP-lipid complexes 4. FIG. 2, panel b is a cryo-TEM image of unilamellar L-α-phosphatidylcholine (PC) liposomes representative of those used in the studies described herein. FIG. 2, panel c is a cryo-TEM image of an HCP-lipid complex formed by the addition of a solution containing 0.5 wt % HCP to a solution of fresh liposomes. The dark region on the left side of FIG. 2, panel c is part of the lacey carbon substrate.

FIG. 5, panel a indicates that aggregation of vesicles occurred within 20 minutes of mixing the HCP complexes and liposomes; unaggregated unilamellar vesicles were also present, as indicated by the arrows. FIG. 5, panel b shows that multilayer vesicles were formed after mixing the system for 4 hours. FIG. 5, panel b also suggests that the layers of the multilayer vesicles can be flexible enough to remain intact upon conformational changes; the arrow in FIG. 5, panel b indicates two adjacent multilayer vesicles which appear to have undergone a change in curvature but which have maintained structural integrity.

FIG. 7, panel a shows vesicle clustering and fusion as an initial step upon addition of the HCP-lipid complexes, including several outer vesicles which appear to be starting to fuse into a center vesicle, resulting in a clustered state where fusion necks are observed (arrows). Panels b-d of FIG. 7 are additional images of the same sample at higher magnifications, indicating clustering of vesicles, as well as the flattening of inner layers (arrow in FIG. 7, panel c) that can be attributed to the incompleteness of the layers and internal pressure gradients from the fusion process. All scale bars are 200 nm.

FIG. 10, panel a shows that the lipid membrane of multilayered vesicles bends as vesicles aggregate. FIG. 10, panel b shows that multilayered vesicles with diameters over 300 nm are present in the samples.

Figure 1:
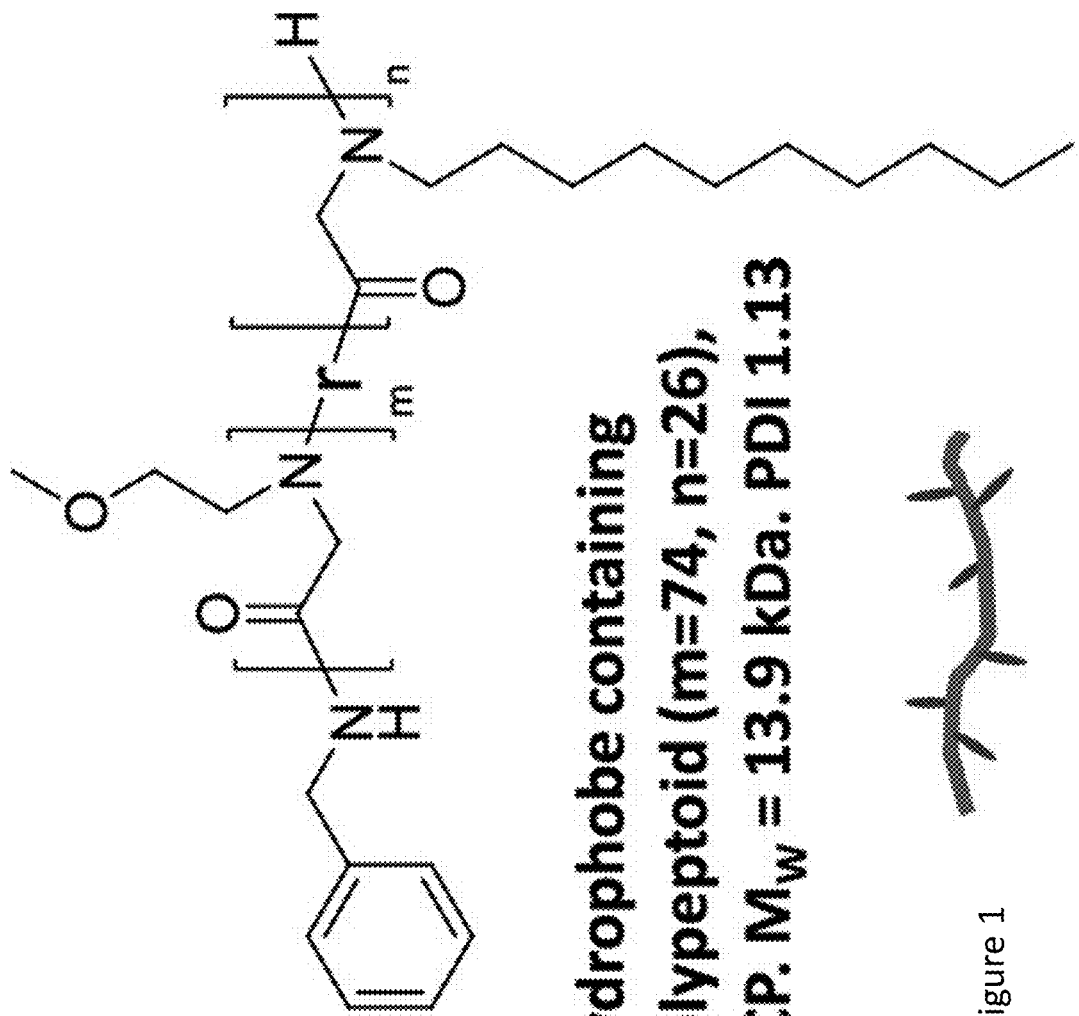
FIG. 1 shows the molecular weight and structure of a hydrophobe containing polypeptoid (HCP) in accordance with embodiments of the present disclosure. Hydrophobic group content, molecular weight, and polydispersity index (PDI) of a typical HCP are also shown.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, biomolecular engineering, and the like, which are within the skill of the art.

The following examples are put forth so as to provide those of ordinary skill in the art with a complete disclosure and description of how to perform the methods and use the structures disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

As used herein, the following terms have the meanings ascribed to them unless specified otherwise. In this disclosure, "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

In accordance with the purpose(s) of the present disclosure, as embodied and broadly described herein, embodiments of the present disclosure, in some aspects, relate to multilayered vesicles and methods of making multilayered vesicles.

The present disclosure includes a method of forming multilayered vesicles. Advantageously, the method can be performed in an aqueous solution without the addition of other solvents and without the use of high-energy shear which can degrade the vesicles. The method can include adding a plurality of hydrophobe containing polypeptoid (HCP)-lipid complexes to a plurality of unilamellar vesicles (e.g. liposomes) in an amount effective to form multilayered vesicles. In some embodiments, remnant dynamically free hydrophobes (e.g. N-decyl groups) on the HCP-lipid complexes bridge the liposomes and fuse them. In some embodiments, the effective amount, or the volume ratio of liposomes to HCP-lipid complexes can be about 1:10 to 10:1, or about 2:1.

In embodiments, HCP-lipid complexes can be formed from mixtures in which the ratio of HCPs with fresh liposomes or unilamellar vesicles, by weight or volume, is from about 1:20 to about 20:1, or from about 1:10 to about 10:1, or from about 1:5 to about 5:1, or from about 1:3 to about 3:1, or from about 1:2 to about 2:1, or about 2:1, or about 1:1. For example, the ratio can be at least 1:20, 1:10, 1:5, 1:3, 1:2, 1:1, or 2:1 and/or up to 1:2, 1:1, 2:1, 3:1, 4:1, 5:1, 7:1, 10:1, or 20:1.

In embodiments, multilayer vesicles can be formed from mixtures of unilamellar vesicles to HCP-lipid complexes in which the ratio of unilamellar vesicles to HCP-lipid complexes, by volume, is from about 1:20 to about 20:1, or from about 1:10 to about 10:1, or from about 1:5 to about 5:1, or from about 1:3 to about 3:1, or from about 1:2 to about 2:1, or about 2:1, or about 1:1. For example, the volume ratio can be at least 1:20, 1:10, 1:5, 1:3, 1:2, 1:1, or 2:1 and/or up to 1:2, 1:1, 2:1, 3:1, 4:1, 5:1, 7:1, 10:1, or 20:1. Alternately, in embodiments, multilayer vesicles can be formed from mixtures of unilamellar vesicles to HCP-lipid complexes in which the ratio of unilamellar vesicles to HCP-lipid complexes, by weight, can be from about 1:20 to about 10:1, or from about 1:10 to about 5:1, or from about 1:5 to about 3:1, or from about 1:3 to about 2:1, or from about 1:2 to about 1:1, or about 2:1, or about 1:1. For example, the weight ratio can be at least 1:20, 1:10, 1:5, 1:3, 1:2, 1:1, or 2:1 and/or up to 1:2, 1:1, 2:1, 3:1, 4:1, 5:1, 7:1, 10:1, or 20:1.

Unilamellar vesicles (e.g., liposomes), multilamellar vesicles, or multilayer vesicles can independently have diameters (or equivalent diameter or size) of from about 0.025 µm to about 2.5 µm, or from about 0.050 µm to about 1.0 µm, or from about 0.075 µm to about 0.50 µm, or from about 0.10 μm to about 0.20 μm. For example, vesicle or liposome diameter or size can be at least 0.01, 0.025, 0.05, 0.075, 0.1, 0.15, or 0.2 μm and/or up to 0.1, 0.2, 0.5, 0.75, 1.0, 1.5, or 2.5 μm. In embodiments, unilamellar vesicles according to the disclosure can be liposomes with a diameter of about 0.10 μm (100 nm). The foregoing sizes can represent a value or range for an average size, for example as a number-, volume-, area-, or weight-average. Similarly, the foregoing size ranges can represent lower and upper bounds of a cumulative size distribution, for example 1/99%, 5/95%, or 10/90% lower and upper cut points of the cumulative size distribution.

Liposomes suitable for demonstrating the effects of the present invention can include liposomes derived from phosphatidylcholine, phosphatidylglycerol, phosphatidylserine, phosphatidic acid, phosphatidylethanolamine, naturally-derived lipids, synthetic lipids, or combinations of the foregoing. In embodiments, one or more cationic lipids can be used to form the HCP-lipid complex, for example a liposome (or cationic liposome) derived from one or more cationic lipids. Such cationic lipids, corresponding liposomes, and corresponding HCP-lipid complexes can be useful to attach to nucleic acids (e.g., DNA, RNA) in applications such as mRNA-based vaccine development. Examples of suitable cationic lipids include dioleoyl-3-trimethylammonium propane (DOTAP), N-[1-(2,3-dioleyloxy)propyl]-N,N,N-trimethylammonium chloride (DOTMA), dioleoyl phosphatidylethanolamine (DOPE), etc.

The term "polypeptoid," as generally used herein, refers to a class of pseudo-peptidic polymers having an aliphatic polyamide backbone with substituents on the backbone nitrogen atoms as opposed to substitution on the backbone carbon centers as in polypeptides. Polypeptoids, while similar in many respects to their polypeptide analogues, do not have stereogenic centers in the backbone like polypeptides. The polypeptoids can lack extensive hydrogen bonding due to the N-substituents. While the backbone chain length of polypeptoids can be long enough to produce tertiary and/or quaternary structure, the tertiary and/or quaternary structure will generally be controlled by the steric and electronic properties of the side chains.

Hydrophobe containing polypeptoids (HCPs) are provided having hydrophobic substituents attached to nitrogen atoms along the backbone. The hydrophobe containing polypeptoids can be chemically synthesized and are not naturally occurring. The hydrophobe containing polypeptoids can be biocompatible. HCPs can have many interesting properties. HCPs at low concentrations can break off parts of liposomes and attach it onto other liposomes. HCPs at higher concentrations can break up liposomes. However, HCPs can keep broken-up parts of liposomes in solution, stabilizing such lipid rafts. The lipid rafts can then be attached onto preexisting liposomes. HCPs can also attach to mucosal surfaces. The HCP can be a poly(α-peptoid), a poly(β-peptoid), or a poly(γ-peptoid).

Hydrophobe containing polypeptoids can be random copolymers of two, three, four, or more different types of monomers. In various aspects, about 5% to 90%, about 5% to 75%, about 5% to 50%, about 5% to 30%, about 10% to 30%, about 10% to 50%, about 10% to 75%, about 15% to 75%, about 15% to 50%, or about 15% to 30% of the repeat units have a hydrophobic substituent attached to the backbone nitrogen atom. Hydrophobic substituents can include substituted or unsubstituted alkoxy, aryloxy, alkyl, alkenyl, alkynyl, aryl, arylalkyl, carbamate, carboxy, cycloalkyl, ester, ether, haloalkyl, heteroaryl, heterocyclyl, and ketone groups having from 6 to 30 carbon atoms, from 10 to 30 carbon atoms, from 12 to 30 carbon atoms, from 15 to 30 carbon atoms, from 15 to 25 carbon atoms, from 12 to 25 carbon atoms, from 10 to 25 carbon atoms, from 10 to 18 carbon atoms, or from 12 to 18 carbon atoms. In some embodiments, the hydrophobic substituents include lauryl, stearyl, behenyl, and cetyl.

In various aspects, the hydrophobe containing polypeptoid includes one or more monomers that have not been hydrophobically modified. For example, the hydrophobe containing polypeptoid can include a repeat unit having a structure according to any one of Formula A1, Formula A2, and Formula A3.

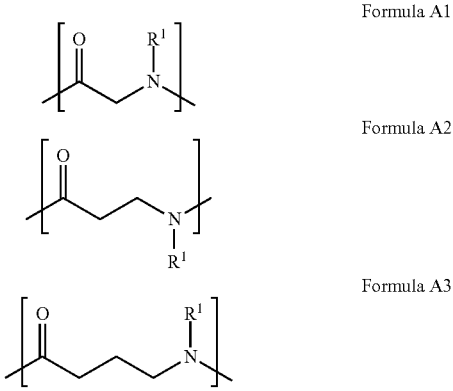

Formula A1

Formula A2

Formula A3

For example, about 20% to 98%, about 30% to 98%, about 30% to 95%, about 40% to 90%, about 40% to 80%, or about 50% to 80% of the repeat units have a structure according to Formula A1, Formula A2, or Formula A3. The substituent $R^1$ can include a hydrogen and substituted and unsubstituted alkoxy, aryloxy, alkyl, alkenyl, alkynyl, aryl, arylalkyl, carbamate, carboxy, cycloalkyl, ester, ether, haloalkyl, heteroaryl, heterocyclyl, and ketone substituents having from 1 to 12 carbon atoms, from 1 to 9 carbon atoms, from 1 to 6 carbon atoms, from 3 to 6 carbon atoms, from 3 to 9 carbon atoms, or from 3 to 12 carbon atoms. In various embodiments, $R^1$ is a methoxyethyl substituent.

The hydrophobe containing polypeptoid includes one or more repeat units that have been hydrophobically modified. For example, the hydrophobe containing polypeptoid can include a repeat unit having a structure according to any one of Formula B1, Formula B2, and Formula B3.

Formula B1

Formula B2

Formula B3

For example, about 2% to 70%, about 2% to 50%, about 5% to 50%, about 5% to 40%, about 5% to 30%, about 5% to 25%, about 10% to 25%, about 10% to 50%, or about 15% to 50% of the repeat units have a structure according to Formula B1, Formula B2, or Formula B3. The substituent $R^2$ can include substituted and unsubstituted alkoxy, aryloxy, alkyl, alkenyl, alkynyl, aryl, arylalkyl, carbamate, carboxy, cycloalkyl, ester, ether, haloalkyl, heteroaryl, heterocyclyl, and ketone groups having from 6 to 30 carbon atoms, from 6 to 25 carbon atoms, from 6 to 20 carbon atoms, from 6 to 18 carbon atoms, from 9 to 18 carbon atoms, from 9 to 20 carbon atoms, from 9 to 25 carbon atoms, from 12 to 25 carbon atoms, from 12 to 20 carbon atoms, or from 12 to 18 carbon atoms. In various embodiments, the $R^2$ substituent is a lauryl, stearyl, behenyl, or cetyl substituent.

In embodiments, the hydrophobe containing polypeptoid can be a random copolymer having a structure according to Formula I or a derivative thereof:

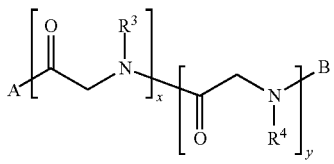

Formula I

In various aspects, x and y can be integers such that x+y is about 12 to 300, about 15 to 300, about 50 to 300, about 50 to 250, about 50 to 200, about 50 to 150, about 75 to 125, or about 100, e.g. x can be about 40 to 95, about 50 to 95, about 50 to 90, about 50 to 85, about 50 to 80, or about 60 to 75, and y can be about 5 to 50, about 5 to 40, about 5 to 30, about 10 to 30, about 10 to 25, about 15 to 25, about 10 to 25, or about 5 to 25. In various aspects, x and y can be decimal numbers from 0 to 1 such that x+y is 1.0, wherein x is about 0.2 to 0.98, about 0.5 to 0.98, about 0.5 to 0.95, about 0.5 to 0.9, or about 0.7 to 0.9, about 0.7 to 0.95, or about 0.7 to 0.98, and wherein y is about 0.02 to 0.8, 0.02 to 0.5, about 0.05 to 0.5, about 0.1 to 0.5, about 0.1 to 0.3, about 0.05 to 0.3, or about 0.02 to 0.3. Each occurrence of $R^3$ can be independently selected from hydrogen and substituted and unsubstituted alkoxy, aryloxy, alkyl, alkenyl, alkynyl, aryl, arylalkyl, carbamate, carboxy, cycloalkyl, ester, ether, haloalkyl, heteroaryl, heterocyclyl, and ketone substituents having from 1 to 15 carbon atoms, 1 to 10 carbon atoms, 1 to 6 carbon atoms, 2 to 6 carbon atoms, or 2 to 10 carbon atoms. Each occurrence of $R^4$ can be independently selected from substituted and unsubstituted alkoxy, aryloxy, alkyl, alkenyl, alkynyl, aryl, arylalkyl, carbamate, carboxy, cycloalkyl, ester, ether, haloalkyl, heteroaryl, heterocyclyl, and ketone groups having from 6 to 30 carbon atoms, from 6 to 25 carbon atoms, from 6 to 20 carbon atoms, from 6 to 18 carbon atoms, from 9 to 18 carbon atoms, from 9 to 20 carbon atoms, from 9 to 25 carbon atoms, from 12 to 25 carbon atoms, from 12 to 20 carbon atoms, or from 12 to 18 carbon atoms. In some embodiments, $R^3$ is selected from hydrogen and substituted and unsubstituted alkyl and alkoxy substituents having from 1 to 6 carbon atoms, and $R^4$ is selected from alkoxy, alkyl, and heteroalkyl substituents having from 12 to 18 carbon atoms. For example, $R^3$ can be methoxyethyl and $R^4$ can be lauryl, stearyl, behenyl, or cetyl. A can be selected from the group consisting of substituted and unsubstituted aryl groups, e.g. A can be a substituted or unsubstituted aryl group having about 4 to 20, about 4 to 12, or about 4 to 8 carbon atoms. B can be a hydrogen, or a substituted or unsubstituted alkyl group having about 1 to 30 carbon atoms, about 1 to 12 carbon atoms, or about 1 to 6 carbon atoms.

The hydrophobe containing polypeptoid can be a random copolymer having a structure according to Formula II or a derivative thereof:

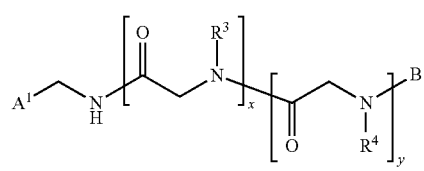

Formula II

In Formula II, x, y, $R^3$, and $R^4$, and B are as described above, and $A^1$ is a substituted or unsubstituted aryl group having about 4 to 20, about 4 to 12, or about 4 to 8 carbon atoms. For example, $A^1$ can be a substituted or unsubstituted phenyl group.

The hydrophobe containing polypeptoid can include any number of repeat units, e.g. about 10 to 500, about 10 to 400, about 12 to 400, about 12 to 300, about 50 to 400, about 50 to 300, about 50 to 200, about 75 to 200, about 75 to 150, about 75 to 125, or about 100. The hydrophobe containing polypeptoid can have a molecular weight from about 10 kDa to 30 kDa, about 10 kDa to 20 kDa, about 12 kDa to 20 kDa, about 12 kDa to 18 kDa, or about 14 kDa.

In some embodiments, the multilayered vesicles can have discontinuous layers. Typical multilamellar vesicles have continuous lamellae that are tightly curved. The multilayered vesicles described herein can have more flexible layers in which portions of the layers can be fragmented. The multilayered vesicles can have a larger diameter than the original liposomes. In some embodiments, the starting liposomes can have a diameter of about 100 nm to 200 nm. When layers are added to these, the resulting multilayered vesicles can be as large as about 500 nm to 1 micron. In larger starting liposomes (e.g. about 500 nm to 1 micron), the addition of layers does not appreciably increase the size of the starting liposome.

In some embodiments, the liposomes can have an average diameter of about 100 nm. In some embodiments, the liposomes can be loaded with a cargo. Advantageously, the multilayered vesicles formed from the liposomes retain the cargo. Cargo in the core can be a water-soluble drug. Examples of suitable water-soluble drugs include water-soluble antibiotics such as tetracycline, ciprofloxacin, etc. Cargo in the core can include nucleic acids (e.g., DNA, RNA) encapsulated in the aqueous core. Cargo in the bilayer can be an oil-soluble or a lipid soluble drug, including but not limited to chemotherapeutics such as doxorubicin, sorafenib, mitomycin, etc. The cargo can be a drug, nutraceutical, or a therapeutic (e.g. vitamins, antibiotics, antiparasitics, antivirals, vaccines, immunotherapies, sedatives, anticancer, antihistamine, insulin, steroids).

Examples of hydrophobic drugs include, but are not limited to, ROCK inhibitors, SYK-specific inhibitors, JAK-specific inhibitors, SYK/JAK or multi-kinase inhibitors, MTORs, STAT3 inhibitors, VEGFR/PDGFR inhibitors, c-Met inhibitors, ALK inhibitors, mTOR inhibitors, PI3Kδ inhibitors, PI3K/mTOR inhibitors, p38/MAPK inhibitors, NSAIDs, steroids, antibiotics, antivirals, antifungals, antiparasitic agents, blood pressure lowering agents, cancer drugs or anti-neoplastic agents, immunomodulatory drugs, psychiatric medications, dermatologic drugs, lipid lowering agents, anti-depressants, anti-diabetics, anti-epileptics, anti-gout agents, anti-hypertensive agents, anti-malarials, anti-migraine agents, anti-muscarinic agents, anti-thyroid agents, anxiolytic, sedatives, hypnotics, neuroleptics, β-blockers, cardiac inotropic agents, corticosteroids, diuretics, antiparkinsonian agents, gastrointestinal agents, histamine H-receptor antagonists, lipid regulating agents, nitrates and other antianginal agents, nutritional agents, opioid analgesics, sex hormones, and stimulants.

In embodiments in which unilamellar vesicles, multilayer vesicles, or liposomes are loaded with a cargo, the weight ratio of the amount of cargo to the amount of vesicle or liposome can be from about 0.01 to about 5.0, or from about 0.05 to about 3.0, or from about 0.10 to about 2.0, or from about 0.20 to about 1.5, or from about 0.5 to about 1.0. For example, the weight ratio can be at least 0.01, 0.02, 0.05, 0.1, 0.2, 0.5, or 1.0 and/or up to 0.1, 0.2, 0.3, 0.5, 0.7, 1, 1.5, 2, 3, 4, 5.

The HCP-lipid complexes can be produced by a method comprising mixing a hydrophobe containing polypeptoid (HCP) with a first set of liposomes at a ratio of about 2:1 by weight to form HCP-lipid complexes comprising about 0.25 wt % lipid and 0.5 wt % HCP. The terms HCP-lipid complex and lipid raft can be used interchangeably herein. Further details about the HCP-lipid complexes and methods of making are described in United States Patent Application Publication 2019/0185622 A1, the contents of which are incorporated herein by reference in its entirety. In some embodiments, the hydrophobe containing polypeptoid in the HCP-lipid complex can include about 100 monomer units and can be a random copolymer of N-methoxyethyl glycine units and N-decyl glycine units.

In some embodiments, the HCP-lipid complex can include a plurality of self-assembled hydrophobe containing polypeptoids that have a polyamide backbone including a random copolymer of two or more different types of repeat units. The repeat units can include a nitrogen atom in the backbone having a hydrophobic substituent attached thereto. The complex can be formed by a physical association of the hydrophobe containing polypeptoid with a lipid or a lipid bilayer fragment of a liposome.

In some embodiments, the methods described above can be performed on a traditional multilamellar vesicle in place of a liposome. In other words, the HCP-lipid complex can be added to a plurality of multilamellar vesicles to form modified multilayered vesicles. This can result in an ability to include additional drugs over a traditional multilamellar vesicle or an increased size to keep a vesicle in place without entering the bloodstream. Such a system could be used in multiple drug delivery. Advantageously, the modified multilayered vesicles could potentially slow degradation by phospholipases and the immune system as macrophages find it hard to digest larger bodies. There is an additional potential building of a few drug containing layers on ghost erythrocytes (e.g. emptied out red blood cells) and erythrosomes (vesicles made from the erythrocyte membrane). This could help evade the immune system and lead to targeted drug delivery.

Embodiments of the present disclosure include a drug delivery complex that includes a multilayered vesicle as above, wherein the multilayered vesicle includes a core surrounded by multiple lipid bilayers. Some of the layers cane be discontinuous lipid bilayers. The core can be loaded with a cargo. In some embodiments, additional cargoes (e.g. hydrophobic cargoes) can be loaded in the lipid bilayers. The bilayer cargoes can be the same or different from one another.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

The mechanistic understanding of the formation and transformation of single bilayer-based vesicles to multilamellar vesicles is a continuing area of active research with implications to the fundamental knowledge of biological systems and to applied aspects of drug delivery. Multilamellar lipid vesicles formed through high energy shear are well documented but the formation of such multilamellar vesicles is imprecise and it is likely that fragile biomolecules in the vesicles are degraded through such shear effects.

The present work is based on a specific manifestation of the hydrophobic effect where alkyl hydrophobes on the backbone of a water-soluble biopolymer insert into membrane lipid bilayers. The concepts of such hydrophobic insertion are well established and is the reason why detergents lyse cell membranes. In the specific system described here, the biopolymer is a polypeptoid. Peptoids are a class of peptide mimics where the substituents are on the nitrogen rather than the carbon atoms. These polymers are therefore structurally similar to peptides and without the hydrogen bonding and stereogenic centers along the backbone have a more flexible conformation leading to resistance against degradation by proteases. The biocompatibility of peptoids renders them useful in biomedical applications.

This example focuses on the use of a hydrophobe containing polypeptoid (HCP) with approximately 100 monomer units where the hydrophobic modification involves the random replacement of about 25% of the N-2-methoxyethyl group with n-decyl groups ($C_{10}$) which form the hydrophobes attached to the backbone of the water-soluble polymer, thus conferring a degree of amphiphilicity to the polymer. The polymer synthesis is summarized in the materials and methods section, and it generally follows the method from United States Patent Application Publication 2019/0185622 and Zhang et al., Langmuir 2017, 33 (11), 2780-2789. FIG. 1 illustrates the structure of the polymer. In the polymer shown in FIG. 1, m=74, n=26, and r denotes the polymer is a random copolymer. The molecular weight is 13.9 kDa with a polydispersity index (PDI) of 1.13. In other embodiments, m+n=100, where m can be from 50 to 99 and n can be from 50 to 1.

Figure 2:
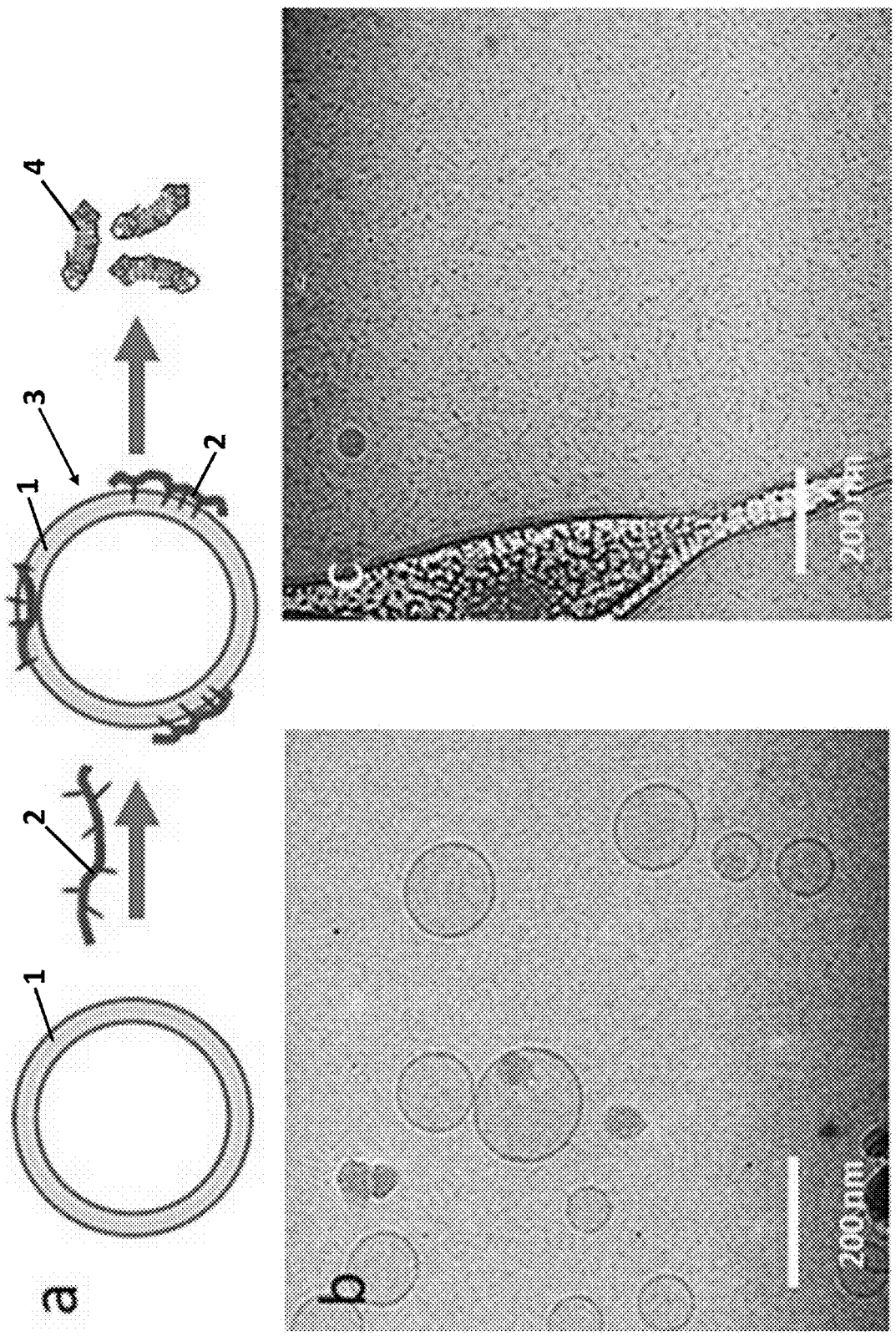
FIG. 2 includes a schematic and images of liposomes according to the disclosure.

Adding small amounts of HCP to phosphatidylcholine-based liposomes can lead to disruption of the liposomes and the formation of 2 and 3 layered liposomes. With sufficient addition of HCP at a composition of 0.25 wt % lipid to 0.5 wt % HCP, all liposomes become fragmented with the formation of HCP-lipid complexes. Panels a-c of FIG. 2 illustrate the concept and shows a cryogenic transmission electron micrograph (cryo-TEM) of such complexes that are formed from liposomes with a diameter on the order of 100 nm. FIG. 2, panel a is a schematic of the mechanism of hydrophobe insertion into the liposome and the resulting disruption into HCP-lipid complexes with an approximate 9:1 lipid: HCP molar ratio. The localized insertion of hydrophobes can compromise membrane integrity, leading to the disruption of the liposome. These nanoscale HCP-lipid complexes have been characterized by small-angle neutron scattering (SANS) in addition to cryo-TEM, indicating elongated small wormlike entities with a 5.1 nm radius of gyration, 2 nm radius and a 38 nm contour length as calculated from the flexible cylinder model fitting. Such HCP-lipid complexes are able to sustain hydrophobic drug moieties and are easily able to enter mammalian cells, leading to potential applications in drug delivery systems.

The focus of this disclosure is on a second manifestation of hydrophobe insertion into lipid bilayers. The method includes the addition of the HCP-lipid complex to new liposomes. In this instance, all hydrophobes of the HCP do not have the ability to insert into the new liposome bilayer as they interact with lipids in the complex. Accordingly, these HCP-lipid complexes are therefore unable to disrupt the liposomes. Rather, they remodel liposomes to build multi-layered vesicles. The present disclosure also shows that the formation of these multi-layered liposomes is the result of the fusogenic properties of the HCP-lipid complexes, which can also arrest intermediate structures, opening up possibilities to further modulating vesicle structure. The details of these findings are described in the following sections of the disclosure.

Experimental Methods
Materials

L-α-phosphatidylcholine (PC, >95%, from soy) was purchased from Avanti Polar Lipids. Fluorescein isothiocyanate-dextran (FITC-dextran, Mw 3-5 kDa) was purchased from Sigma Aldrich. All other chemicals and solvents were purchased from Sigma Aldrich and used as received unless otherwise noted. The solvents used for polymerization were further purified by using alumina columns under argon protection. $CD_2Cl_2$ and $CDCl_3$ were purchased from Cambridge Isotope laboratories. $^1H$ NMR was collected by Bruker AV-400 III spectrometer at 298K and analyzed using Topspin software. Chemical shifts (δ) given in parts per million (ppm) were referenced to proton impurities.

Hydrophobe Containing Polypeptoid (HCP) Synthesis

N-decyl glycine derived N-carboxyanhydride (De-NCA) and N-methoxyethyl glycine derived N-carboxyanhydride (MeOEt-NCA) monomers were synthesized by published procedures. The HCPs were synthesized through primary amine-initiated ring-opening polymerization of the corresponding R-NCA monomers as described in United States Patent Application Publication 2019/0185622 A1. Copolymerization of N-methoxyethyl NCA and N-decyl NCA yields a random copolymer of N-methoxyethyl glycine units and N-decyl glycine units. In a typical synthesis, in glove box, stock solutions of MeOEt-NCA (1.3 mL, 0.52 mmol, 0.4 M) and De-NCA (433 μL, 0.17 mmol, 0.4 M) in THF were pre-mixed before the addition of benzyl amine stock solution (74.8 μL, 6.9 μmol, 92.7 mM) in THF. The mixture was stirred at 50° C. under nitrogen atmosphere for 72 h to reach complete conversion. The polymerization conversion was tracked by monitoring the disappearance of —C═O peak at 1780 $cm^{-1}$ and 1740 $cm^{-1}$ in the reaction aliquots taken over time using FT-IR spectroscopy. The volatiles were removed under vacuum using Schlenk line. The crude polymer was further purified by re-dissolved in DCM and precipitated with ample hexanes twice to obtain the final product as a white solid (61.6 mg, 65.6% yield). Polymer composition was determined by end group analysis using $^1H$-NMR and the polymer polydispersity index (PDI) was obtained using size-exclusion chromatography (SEC).

Size-Exclusion Chromatography (SEC)

SEC experiments were performed in DMF with 0.1 M LiBr at 25° C. with a flow rate of 0.5 ml/min. 3.0 mg HCP polymer was dissolved in DMF solution (0.6 ml) containing LiBr (0.1M) and left to stand overnight. The polymer solutions were filtered with 0.45 μm PTFE filters before injecting into the SEC system. SEC analysis of the hydrophobe containing polypeptoids was performed using an Agilent 1200 system equipped with three Phenomenex 5 μm, 300×7.8 mm columns, a Wyatt DAWN EOS multiangle light scattering (MALS) detector (GaAs 30 mW laser at λ=690 nm) and Wyatt OptilabrEX differential refractive index (DRI) detector. The data analysis was performed using Wyatt Astra V 5.3 software. The PDI were obtained using polystyrene standards.

Liposome Preparation

The liposomes were prepared by the thin-film hydration technique where the lipids are first dissolved in an organic solvent and then evaporated to form a lipid thin film. Typically, 100 mg PC lipid was dissolved in 15 mL chloroform and methanol mixture (2/1, v/v) in a round bottom flask. The solvent was then evaporated on a rotavapor (Buchi R-205) at room temperature at 100 mbar for 3 hours to form a thin lipid film. The film was further treated in vacuum at 6 mbar for 30 min to remove residual solvent. The formed thin lipid film was then hydrated using DI water at 50° C. which yielded a suspension of large lipid vesicles. FITC-dextran loaded vesicles were prepared in the similar way with the exception of using FITC-dextran solution in DI water for the hydration step. The lipid film was hydrated by using 1 mg/mL of FITC-dextran solution at 50° C. for 30 min. The vesicle suspension was extruded 21 times through polycarbonate membrane with a pore size of 100 nm to downsize the unextruded vesicles into small unilamellar vesicles with an average diameter of 100 nm.

Cryo-SEM

A Hitachi S-4800 field emission Scanning Electron Microscope with the operating voltage of 3 kV was used to obtain cryogenic SEM images of emulsions and bacterial biofilm. Samples were loaded into rivets mounted onto the cryo-SEM sample holder. The samples were then plunged into slushed liquid nitrogen to freeze the sample. This was followed by fracturing at −130° C. using a flat-edge cold knife and sublimation of the solvent at −95° C. for 15 min to etch the sample. The temperature was lowered back to −130° C. and the sample was then sputtered with a gold-palladium composite at 10 mA for 132 s before imaging.

Cryo-TEM

The morphology of the complexes was characterized by FEI Tecnai G2 F30 twin transmission electron microscope operated at 300 kV equipped with SDD EDS for elemental mapping. Cryo-TEM imaging was done on an FEI G2 F30 Tecnai TEM operated at 150 kV. To prepare the sample, a 200-mesh lacey carbon grid (Electron Microscopy Sciences) was picked up with tweezers and mounted on the plunging station of an FEI Vitrobot. Four microliters of the solution were applied to the grid. The excess liquid was blotted by filter paper attached to arms of the Vitrobot for 2 s to form a thin film. The sample was then vitrified by plunging into liquid ethane. The vitrified sample was finally transferred onto a single-tilt cryo specimen holder for imaging.

SAXS

Small-angle X-ray scattering (SAXS) experiments were performed at the Advance Photon Source on beamline 12-BM. All measurements were conducted with the 12 keV beam. All measurements were conducted at 25° C. The samples were loaded in 1.5 mm quartz capillaries and placed on a sample holder at a sample-to-detector distance of 2 m. The data are presented as absolute intensity versus the wave vector $q=4\pi \sin(\theta/2)/\lambda$, where $\lambda$ is the wavelength and $\theta$ is the scattering angle. The reduction of SAXS data and background subtraction were performed by using Irena SAS macros on IGOR pro software.

Fluorescent Microscopy

FITC-dextran was encapsulated within liposomes by hydrating lipid film with aqueous solution of FITC-dextran. The loaded liposome suspension was transferred to a syringe and extruded 21 times through an 800 nm polycarbonate membrane. Unencapsulated FITC-dextran was removed by dialyzing through a dialysis bag (MW cutoff: 30 kDa) against a 100:1 deionized water bath volume at 25° C. for 1 h. Fluorescent microscopy images were taken with a Nikon A1 confocal microscope. 20 µL sample was pipetted onto a standard microscope slide. 488 nm laser was used to excite the fluorescence-tagged samples, the emission wavelength is 525 nm.

Results and Discussion

Figure 3:
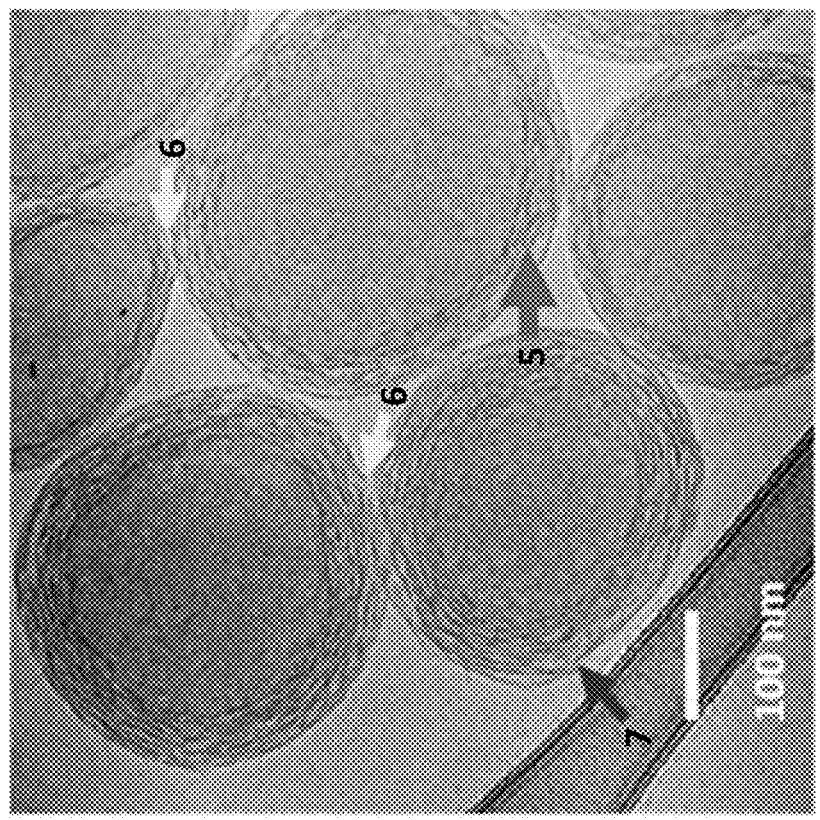
FIG. 3 (right) is a cryo-TEM image showing multilayered vesicles that were formed upon addition of HCP-lipid complex 4 to fresh liposomes 1, as suggested by the schematic (left). Liposomal templates (0.25 wt % lipid) and HCP-lipid (0.25 wt % lipid and 0.5 wt % HCP) complexes were mixed to generate the multilayered vesicles (final concentrations: 0.25 wt % lipid, 0.17 wt % HCP) shown in the image. Certain parts of the TEM image, such as 5, illustrate that the layers of the multilayered vesicles do not appear to be fully continuous and appear to be looser and more flexible than the layers in typical liposomes or multilamellar vesicles. 6 indicates sites where adjacent multilayer vesicles may be connected. 7 indicates a free ending of a layer of the multilayer vesicle, highlighting the discontinuity of the layer.
Figure 3:
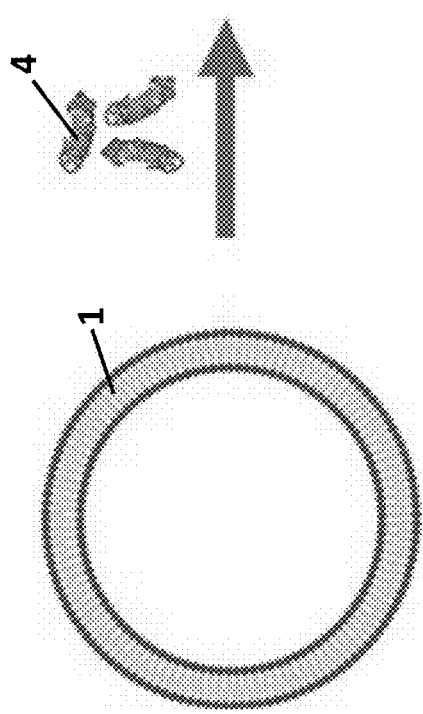

FIG. 3 illustrates the methods of the present disclosure. The concise description is as follows: 1) upon mixing lipid vesicles (panels a-c of FIG. 2) with HCP at a lipid to HCP weight ratio of 1:2 the vesicles rupture and equilibrate into approximately 10 nm fragments (panels a-c of FIG. 2); 2) the fragments when mixed with fresh liposomes (2:1 volume ratio of liposomes (0.25 wt % lipid) to HCP-lipid complexes (0.25 wt % lipid, 0.5 wt % HCP)) lead to the formation of multilayered vesicles as shown in FIG. 3. On close examination of the vesicles, the following observations can be made: (1) The layered vesicles are usually larger than the original PC liposomes, (2) the layers do not appear to be continuous, and (3) the individual layers appear to be more loose and flexible rather than the tight curvatures formed in liposomes or traditional multilamellar vesicles (MLVs). Since the layers do not appear to be continuous lamellae, these structures are more accurately described as multilayered vesicles rather than multilamellar vesicles. Apparent connections between these structures can also be observed, but it is not entirely clear if these are actual connections or simply small overlaps between adjacent vesicles.

Figure 4:
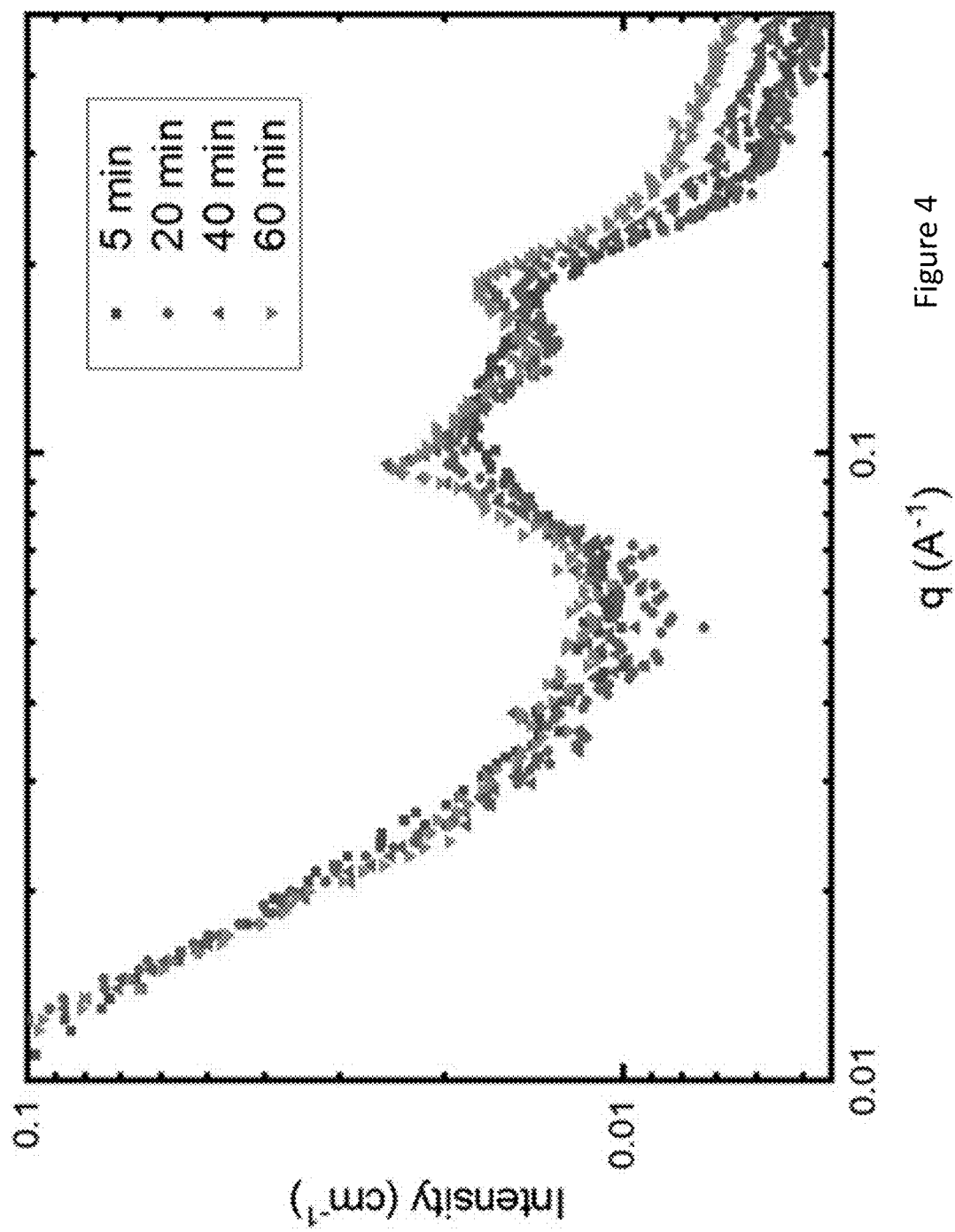
FIG. 4 shows the results of time-dependent small-angle X-ray scattering (SAXS) measurements taken on a sample of fresh liposomes to which a solution of HCP-lipid complexes was added (at time 0). The data indicate a transition to multilayered vesicles after HCP-lipid complex addition. Diffraction peaks can be seen at 40 min post mixing, indicating the presence of multilayered vesicles.

Time-dependent SAXS analysis of the process of the multi-layer formation was conducted at the Advanced Light Source at Argonne National Laboratory, with the results shown in FIG. 4.

The sample was kept stationary in a capillary and the high flux of the synchrotron x-ray radiation allows sufficient data acquisition in 10 seconds, providing an opportunity to capture the scattering curves as the sample undergoes transitions in real time. The $q^{-2}$ decay at low q is indicative of the presence of bilayer structures. Broad diffraction peaks emerge as early as 20 mins and sharpen and stabilize around 40 mins. As the incubation time increases, the signal reveals the diffraction peaks at $q=0.095$ $A^{-1}$ and $q=0.19$ $A^{-1}$, where the first peak indicates a repeat distance d of 6.6 nm and the second peak is the higher order peak verifying a lamellar structure. The broadness of the peaks is perhaps correlated to the fact that these are multilayered structures with wavy sheets and with rather imprecise spacings.

Figure 5:
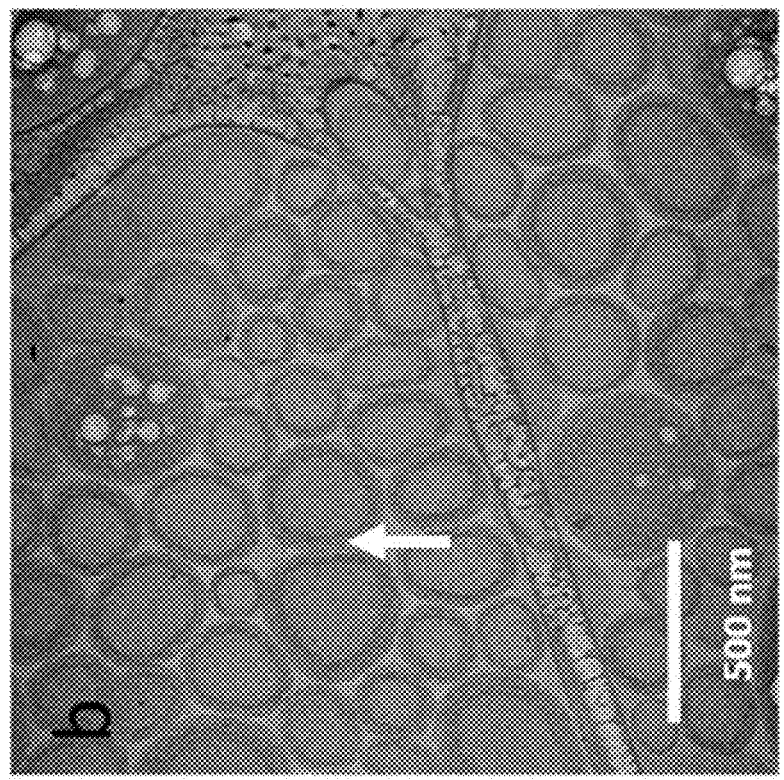
FIG. 5 includes cryo-TEM images of samples taken 20 minutes (panel a) and 4 hours (panel b) after mixing a solution containing 0.25% liposomes with a solution of an HCP-lipid complex containing 0.25% lipid and 0.5% HCP25. ('HCP25' as used here and throughout this disclosure denotes an HCP containing approximately 100 monomer units including approximately 25 decyl groups randomly distributed along the backbone.) The mixed solution contained 0.25% lipid and 0.17% HCP25.
Figure 5:
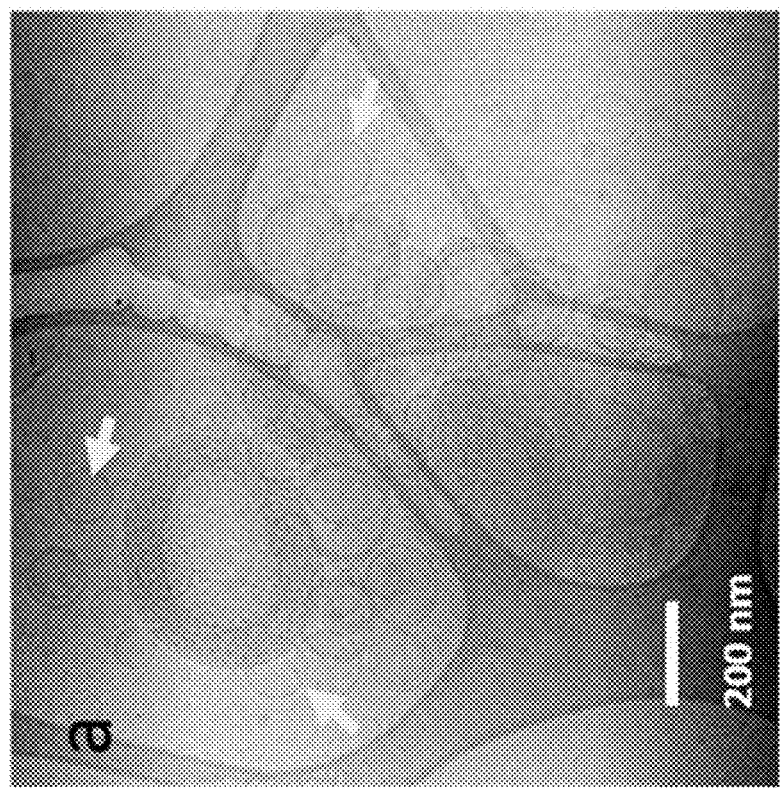

Panels a and b of FIG. 5 are cryo-TEM images which show the evolution of the multilayered structure.

Vitrifying the sample after 20 mins shows a transition from the essentially unilamellar structures of FIG. 5, panel a (left) to a system containing a mixture of remnant unilamellar liposomes with the emergence of bilayered and multilayered vesicles. It is also important to note the observation of vesicle clustering. The clustering could be the initial step of multilayered vesicle formation where the HCP-lipid complexes attach to unilamellar vesicles and bring vesicles together. It is also possible, although somewhat speculative, that the depletion effect of adding small colloids (the HCP-lipid complexes) to the much larger liposomes leads to the clustering of the larger liposomes following which growth into multilayered structures occurs. However, growth into layered structures with unmodified polypeptoids (UMP), in which all the nitrogen substituents are methoxy ethyl moieties (FIG. 1), has not been observed, suggesting that the alkyl hydrophobes on the backbone are responsible for this transition.

Figure 9:
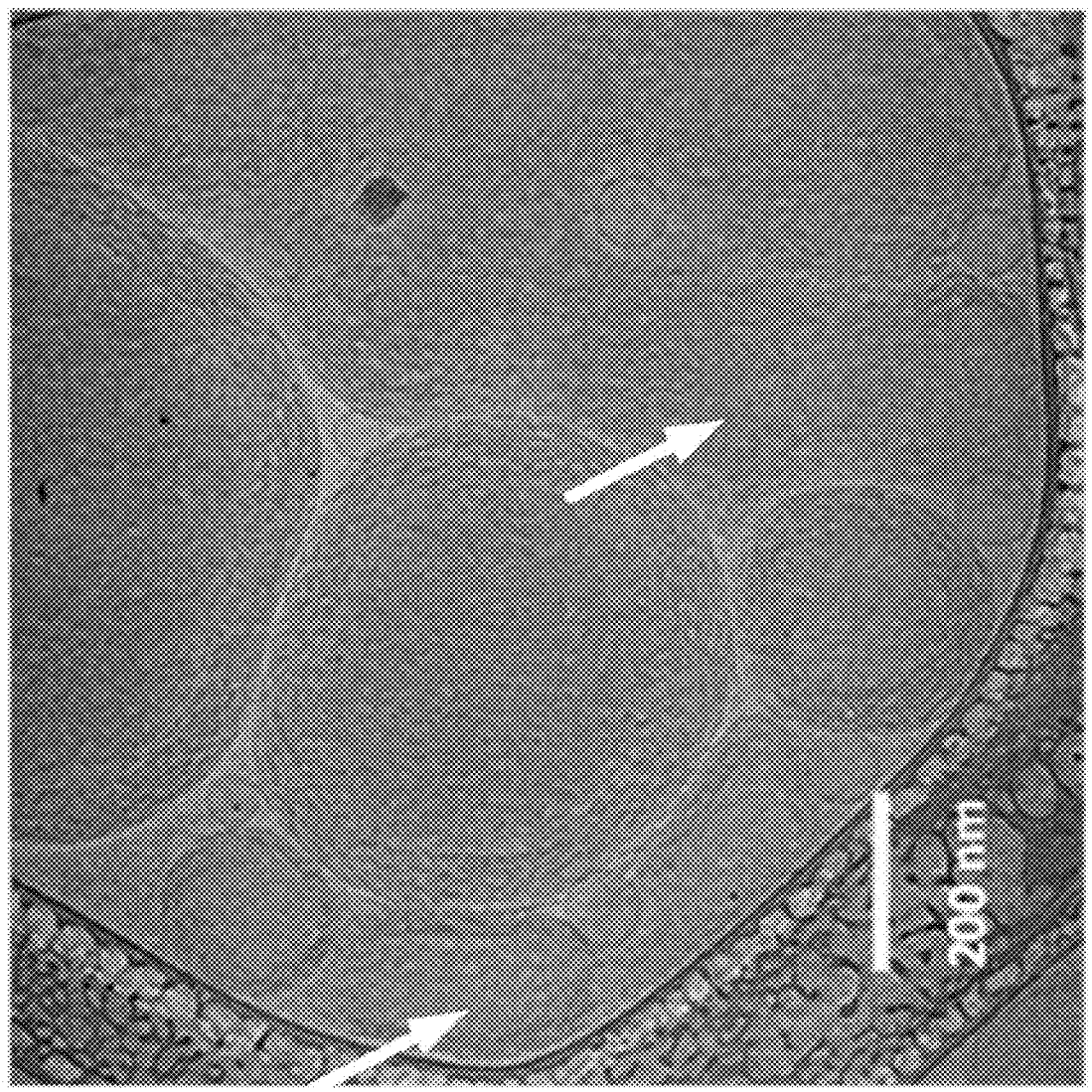
FIG. 9 is a cryo-TEM image of a sample taken 4 h after mixing a solution containing 0.25% fresh liposomes with a solution of HCP-lipid complexes containing 0.25% liposomes and 0.5% HCP25. Final concentrations are 0.25% liposomes and 0.17 wt % HCP25. Structures other than spherical multilayered vesicles can be seen, as indicated by the arrows.

When the sample was incubated at room temperature for 4 hours, large areas of the grid contain the multilayered vesicles as shown in FIG. 5, panel b. Flexibility in the curvature of the multilayered vesicles can be observed, suggesting a tendency for two adjacent vesicles to flatten. After the 4 hour incubation period, some extremely large multilayered vesicles could be observed, as shown in FIG. 9, which shows additional cryo-TEM images of the flexible vesicles. This transition from unilamellar liposomes to multilayered vesicles through the addition of such HCP-lipid fragments is unique.

Figure 6:
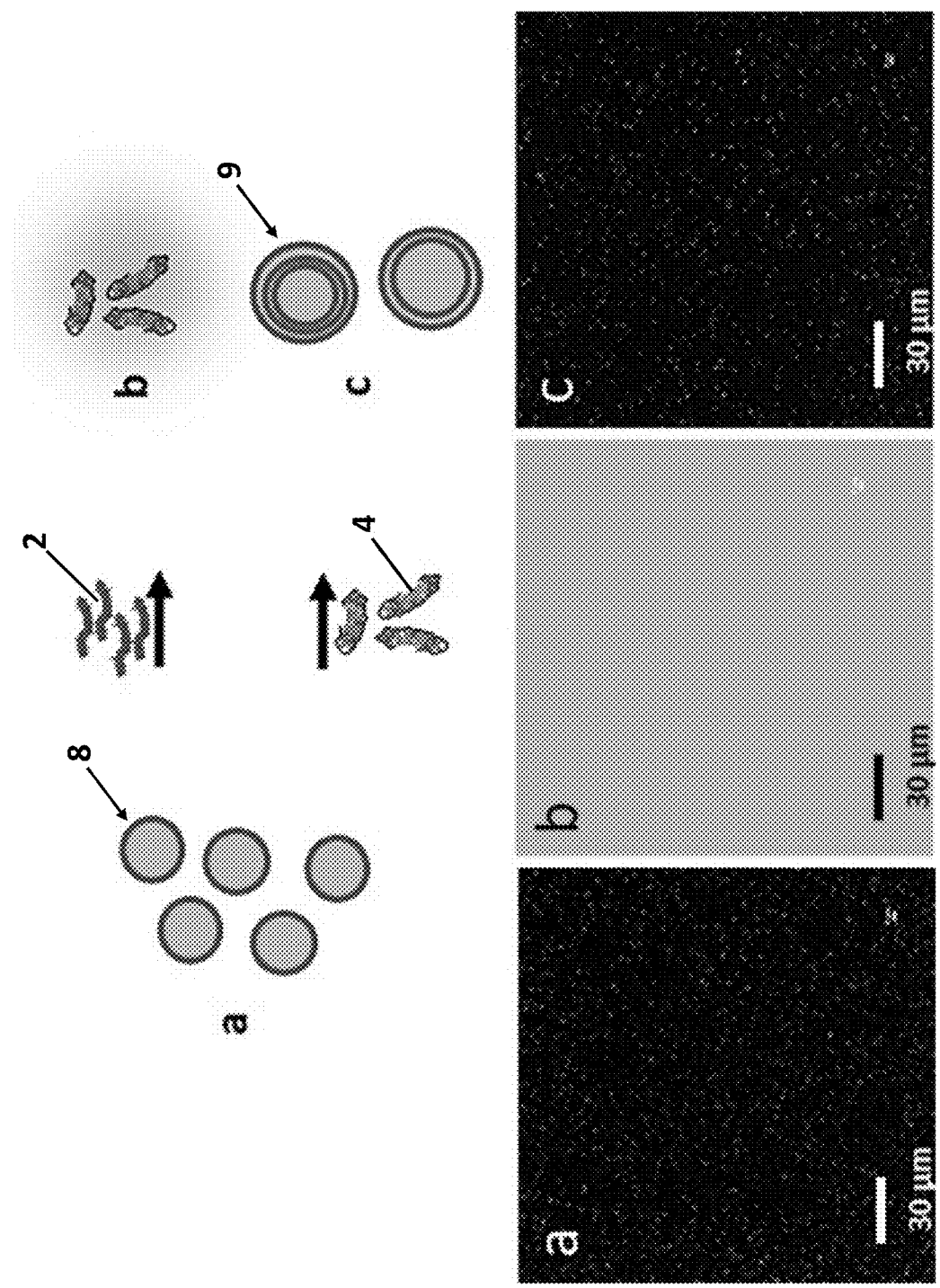
FIG. 6 illustrates the FITC-dextran leak test, which was used to confirm retention of liposomal cargo upon transformation from unilamellar vesicles to multilayer vesicles. The top half of FIG. 6 shows schematic representations of the transformations of liposomes upon mixing with HCP or HCP-lipid complexes. In the first schematic, liposomes loaded with FITC-dextran 8 are mixed with HCPs 2 to form HCP-lipid complexes; this addition causes liposome disruption and release of FITC-dextran from the interior of the liposomes into solution. In the second schematic, liposomes loaded with FITC-dextran 8 are mixed with HCP-lipid complexes 4; this addition results in formation of multilayer vesicles 9 which retain the FITC-dextran contained in the starting liposomes. The bottom half of FIG. 6 shows fluorescence microscopy images of samples corresponding to the states illustrated in the top half of the figure. Image (a) shows the starting liposomes (0.25 wt % liposomes loaded with 0.2 wt % FITC-dextran (4 kDa)); the pinprick-type fluorescence pattern indicates the FITC-dextran dye is contained within the liposomes. Image (b) shows the system after 0.5 wt % HCP was added to the liposomes; this addition disrupted the liposomes and released the dye into solution, as evidenced by the broad background fluorescence seen in the microscopy image. Image (c) show the system following addition of HCP-lipid complexes to the starting liposomes shown in (a); the pinprick-type fluorescence pattern was maintained, indicating the dye remained confined to the interior of the liposomes and the liposomes maintained their structural integrity.

A part of characterizing the mechanism of multilayer formation is in assessing the structural stability of the added lipid vesicles acting as templates for growth of the layers. In other words, it is necessary to understand if liposomes originally loaded with a water-soluble drug lose their cargo when they transition to the multilayer structure. Accordingly, an FITC-dextran leak test was performed, in which HCP was added to liposomes which had been loaded with fluorescent FITC-dextran, as shown schematically as the pathway from a to b in FIG. 6.

The HCP complexly disrupts the liposomes releasing the fluorescent dye as seen in the transition from the bright pinprick type fluorescent pattern in system a to the broad background fluorescence in system b. The pathway from a to c is one where liposomes loaded with FITC-dextran were contacted with the HCP-lipid complexes. The retention of the bright dot pattern in system c is an indication that there is negligible dye leakage in this pathway. Thus, the observation indicates that there must be clear fusion or bridging between liposomes in the creation of the multilayers to allow retention of the cargo in the multilayered structure.

Figure 7:
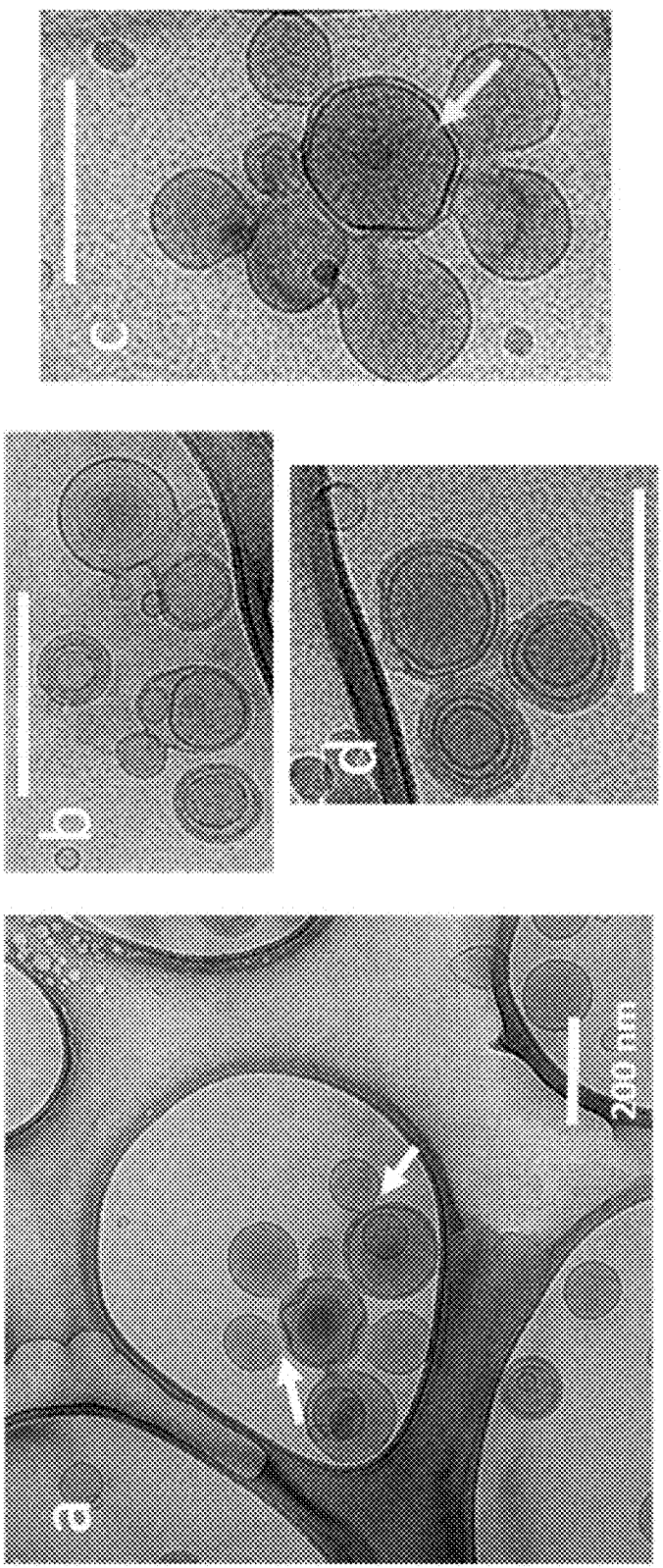
FIG. 7 shows cryo-TEM images of a sample of liposomes to which a small quantity of HCP-lipid complexes (10 vol % of the level used to rapidly form multilayered vesicles) was added. The resulting sample contains 0.25 wt % lipid and 0.05 wt % HCP. The sample was incubated for 24 h prior to vitrification and imaging.

To try to arrest the formation of the multilayered liposomes, an experiment was conducted in which a small aliquot of the HCP-lipid complexes (10 vol % of the level used to rapidly form the multilayered vesicles) was added to fresh liposomes. The system was incubated for 24 hours prior to vitrification and imaging. Interestingly, as FIG. 7 (panels a-d) illustrates, there is clear evidence of vesicle fusion that is arrested. Panels a-d of FIG. 7 include images from various parts of the TEM grid to show regions of multiple fused vesicles, some containing multiple layers.

Fusion "necks," where bilayers join (as indicated by arrows in FIG. 7, panel a), can also be observed. In vesicles with few layers, a flattening of layers (as indicated by the arrow in FIG. 7, panel c) can be observed, again indicating flexibility in the layers that may be made up of bilayer strands rather than a complete bilayer. In a sense these cryo-TEM images provide a rationale for the fact that large molecule contents of vesicles do not leak out during fusion which may be the initial step to multilayer vesicle formation. The observation is very similar to the vesicle fusion that is done by SNARE proteins (snap receptor proteins) that mediate neurotransmitter release, although the literature on SNARE proteins does not substantially address the formation of multilayered vesicles. In this sense, the behavior of HCP-lipid complexes resembles that of SNARE proteins by being fusogenic to vesicles, and at high concentrations being able to form multilayered vesicles. The literature cites other examples of systems that induce fusion. For instance, carbon nanotubes have been shown to induce vesicle fusion through insertion of the nanotube into the bilayers of adjacent vesicles and allowing a sliding of lipid molecules along the hydrophobic surface of the nanotubes. Metal ion binding to amphiphilic ligands consisting of synthetic bipyridine lipo-ligands has been reported to induce fusion of vesicles leading to giant vesicles. These results indicate that bridging vesicles could be a general phenomenon to induce fusogenesis. In the present systems, addition of the HCP-lipid complexes at 40% of the level required to rapidly form the multilayered vesicles also led to formation of multilayered vesicles, albeit seemingly with a reduced number of layers. The results, shown in FIG. 10, panels a and b, perhaps point to variations in the rate of formation of the multilayered vesicles as a function of the concentration of the complexes. Again, flexibility of the curvatures of the multilayered vesicles shown in panels a and b of FIG. 10 can be observed.

First, it is recognized that the hydrophobic interaction is responsible for the tendency of the alkyl chains of HCP to shield themselves from water and embed into the lipid bilayer. Functionalization of the polypeptoid yields randomly distributed alkyl chains throughout the backbone. The HCP-lipid fragments are prepared from mixing lipid and HCP at a 9:1 molar ratio (0.25 wt % lipid with Mw 775 g/mol and 0.5 wt % HCP25 with Mw 13900 g/mol). Every molecule of HCP contains on average 25 randomly distributed decyl groups as the hydrophobes. If there are 9 lipid molecules attached to each HCP, the number is translated to approximately 1 lipid for every 3 hydrophobes. The observation that HCP on its own disrupts lipid bilayers implies that the 25 hydrophobes on each HCP molecule are available to insert into lipid bilayers and disrupt the bilayers. On the other hand, in the HCP-lipid complex, some of the hydrophobes are noncovalently attached to lipid species and there are fewer hydrophobes available to create membrane disruption. Accordingly, the HCP-lipid complexes can attach to liposomes without disrupting them as a first step, as shown in step (a) of FIG. 8.

The self-assembly to multilayered vesicles may begin with vesicle clustering through the depletion interactions brought about by the HCP-lipid complexes that are initially in solution prior to interaction with the vesicles. After attachment to a vesicle some of the free hydrophobes then insert into lipid bilayers of an adjacent vesicle forming the fusogenic cluster as shown in (b) of the top row (i) FIG. 8, which also indicates the formation of bridging necks of two vesicles undergoing fusion. (c) and (d) show the process of an outer vesicle engulfing an inner vesicle to form a bilayered system. The sequence in the second row essentially shows addition of layers where a unilamellar vesicle fuses to a multilayered vesicle and then opens up to engulf the larger layered vesicle, thus adding a portion of an additional layer to the multilayered vesicle. Arresting the process with insufficient HCP-lipid complexes may lead to the formation of multilayered vesicles with attached single layer vesicles that are unable to fully fuse into another layer, as shown in the cryo-electron micrographs of panels a-d of FIG. 7. A somewhat similar transition has been proposed to understand the fusion when anionic DNA is attached to cationic vesicles and therefore bridges between vesicles. The mechanism of such induced fusion is electrostatics, while this work describes the bridging of vesicles using the hydrophobic interaction.

Figure 8:
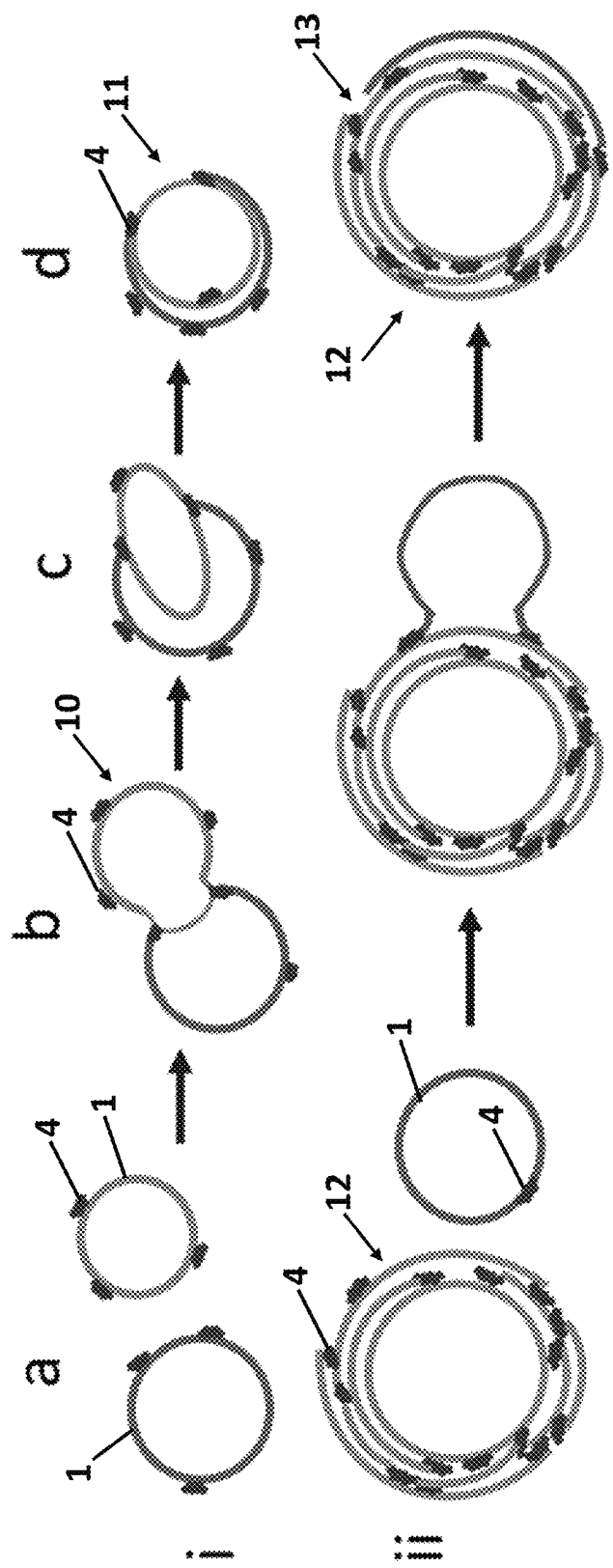
FIG. 8 shows schematic representations of potential mechanisms for transition of unilamellar vesicles to multilayered vesicles. The top row (i) shows fusion of two unilamellar vesicles 1 containing bound HCP-lipid complexes 4 (a) to form a two-vesicle cluster 10 with bound HCP-lipid complexes 4 (b) followed by engulfment of one vesicle by the other (c) and the formation of a bilayered vesicle 11 with bound HCP-lipid complexes 4 (d). The bottom row (ii) shows the continuation of the process, wherein a multilayered vesicle 12 with bound HCP-lipid complexes 4 may fuse with a unilamellar vesicle 1 to add further layers to the multilayered vesicle 12, for example where a bilayered vesicle 11 can add third and subsequent layers to form a general multilayered vesicle 12. Multilayer vesicles 12 may include one or more layers that are not continuous, as illustrated by a discontinuity or gap 13 in one or more of the layers.

Thus, as shown in the second row (ii) of FIG. 8, the layering of vesicles can occur by building around existing layers. A new layer cannot assemble in between existing layers but can only become the outermost one. The multilayered vesicle formation schematic in FIG. 8 is an attempt to explain the existence of open bilayers wrapped around vesicles through HCP-lipid complex bridging. The resulting structures can possibly undergo transitions described in FIG. 8 until all the HCP-lipid fragments are used. The mechanisms outlined in FIG. 8 serve to describe the processes occurring during the transition in a sequence but potentially take place very quickly to the stable conformation of multilayers as shown in FIG. 3.

Figure 10:
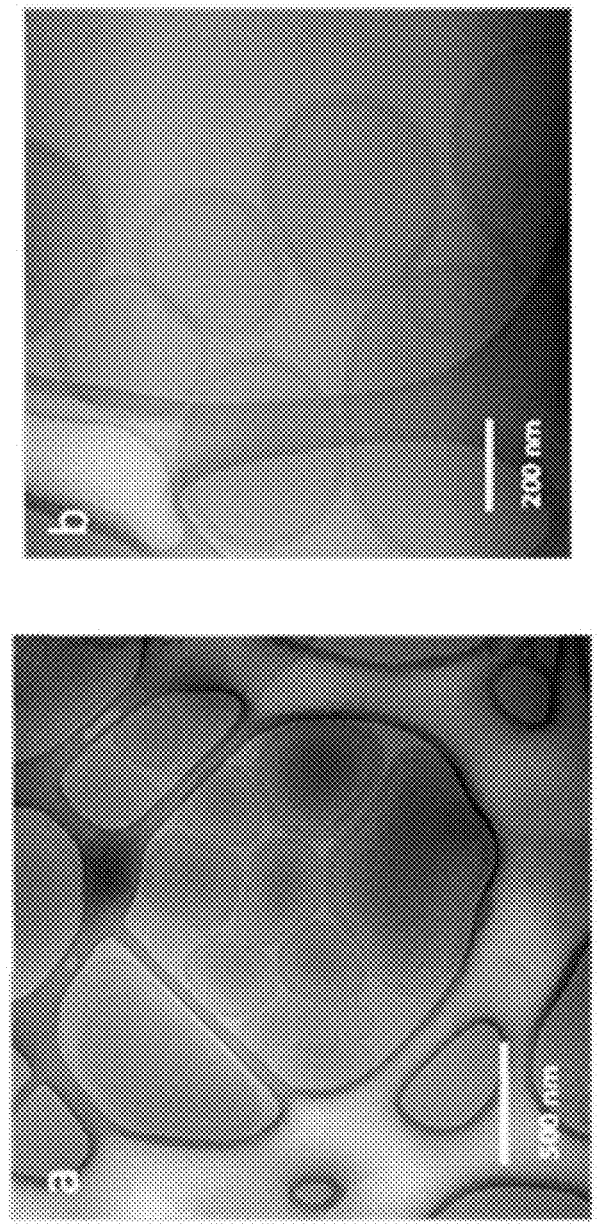
FIG. 10 shows cryo-TEM images of a sample of multilayered vesicles formed from mixing fresh liposomes with 40 vol % of the amount of HCP-lipid complex used to rapidly form multilayer vesicles. Final concentrations are 0.25 wt % lipid and 0.14 wt % HCP25.

FIG. 9 shows a cryo-TEM of a 4-hour sample. Time dependent cryo-TEM images were obtained by vitrification of the samples at time points before complete equilibration. At 4 hours post mixing of HCP-lipid complexes and liposomes, the multilayer formation had already proceeded to the extent that no unilamellar vesicles are observed. Below is an additional image captured at 4 hours post complex and liposome mixing. The image shows the presence of structures different from intact spherical multilayered vesicles. The multilayer nature is still present, although the vesicle shape is distorted. Panels a and b of FIG. 10 show cryo-TEM images of multilayered vesicles formed with a smaller aliquot of HCP-lipid complexes. Formation of multilayered vesicles, as discussed above, occurs through mixing of lipid-HCP complexes and liposomes at a 1:2 ratio, thus the volume of complexes is 50% of the volume of liposomes before mixing. Adding the HCP-lipid complexes at a lower concentration could provide more insight into the multilayered vesicle formation. Images in FIG. 10 demonstrate that when the HCP-lipid complexes were added at the concentration of 40 v %, fewer layers were formed around liposomes. Additionally, large vesicle distortion and bending of the vesicle membrane was observed.

In summary, the addition of HCP-lipid complexes to lipid vesicles initiates a transformation to multilayered vesicles through an initial clustering and an engulfment of vesicles. It is remarkable that the clustering and engulfment retains large molecule intra-vesicular cargo without spillage into the bulk aqueous medium. The process can be controlled through the amount of the complexes that are added, leading to an arresting of intermediate structures en route to the formation of multilayered vesicles. The layers of the multilayered vesicles appear to be made of incomplete sheets of lipid bilayers which may be connected or bridged by the HCP-lipid complexes. The entire process is a consequence of hydrophobe insertion into lipid bilayers through the hydrophobic effect.

The consequences of these observations are significant. The biocompatibility of polypeptoids implies that these materials may find applications in therapeutics. While earlier work has shown that the HCP-lipid complex can enter cells, the observations shown here indicate that the complexes could be used in targeting intracellular organelles. Additionally, multilayered vesicles can be designed with specific cargo in the core and multiple hydrophobic cargoes in the lipid bilayers opening new avenues in delivering therapeutics. The ability to fuse vesicles with small amounts of the complexes additionally points to analogies with SNARE proteins and the ability to influence neurotransmission.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

What is claimed is:

1. A method of forming multilayered vesicles, comprising:
   adding a plurality of hydrophobe containing polypeptoid (HCP)-lipid complexes to a plurality of unilamellar vesicles in an amount effective to form multilayered vesicles comprising four or more successive fused layers and HCP-lipid complexes bound thereto; wherein:
   (A) the HCP-lipid complexes comprise (i) pendant hydrophobe groups inserted into a lipid group, and (ii) dynamically free hydrophobe groups;
   (B) the dynamically free hydrophobe groups bridge and fuse the successive layers of the multilayered vesicles;
   (C) the multilayered vesicles comprise flexible layers comprising lipid bilayer sheets bridged by the HCP-lipid complexes; and
   (D) the multilayered vesicles do not comprise multilamellar vesicles.

2. The method of claim 1, wherein the HCP-lipid complexes are produced by a method comprising mixing a hydrophobe containing polypeptoid (HCP) with a first set of unilamellar vesicles at a ratio of about 2:1 by weight to form HCP-lipid complexes comprising about 0.25 wt % lipid and 0.5 wt % HCP.

3. The method of claim 1, wherein the effective amount is about a 2:1 solution volume ratio of unilamellar vesicles to HCP-lipid complexes.

4. The method of claim 1, wherein the unilamellar vesicles are liposomes.

5. The method of claim 4, wherein the liposomes have an average diameter of about 100 nm.

6. The method of claim 1, wherein the HCP-lipid complexes have a length of about 10 nm.

7. The method of claim 1, wherein the multilayered vesicles have a larger diameter than the unilamellar vesicles.

8. The method of claim 1, wherein the unilamellar vesicles are loaded with a cargo, and wherein the multilayered vesicles retain the cargo.

9. The method of claim 8, wherein the cargo is a water-soluble drug.

10. The method of claim 1, wherein the hydrophobe containing polypeptoid comprises about 100 monomer units and is a random copolymer of N-methoxyethyl glycine units and N-decyl glycine units.

11. The method of claim 1, wherein the HCP-lipid complex comprises:
    a plurality of self-assembled hydrophobe containing polypeptoids,
    wherein the hydrophobe containing polypeptoid comprises a polyamide backbone comprising a random copolymer of two or more different types of repeat units,
    wherein one or more of the repeat units comprise a nitrogen atom in the backbone having a hydrophobic substituent attached thereto; and
    wherein the complex is formed by a physical association of the hydrophobe containing polypeptoid with a lipid or a lipid bilayer fragment of a liposome.

12. A drug delivery complex comprising:
    a multilayered vesicle comprising four or more successive fused layers and HCP-lipid complexes bound thereto; wherein:
    the HCP-lipid complexes comprise (i) pendant hydrophobe groups inserted into a lipid group, and (ii) dynamically free hydrophobe groups;
    the dynamically free hydrophobe groups bridge and fuse the successive layers of the multilayered vesicle, thereby defining a core surrounded by multiple lipid bilayers;
    at least a portion of the layers are discontinuous lipid bilayers;
    the multilayered vesicle comprises flexible layers comprising lipid bilayer sheets bridged by the HCP-lipid complexes; and
    the multilayered vesicle does not comprise a multilamellar vesicle.

13. The drug delivery complex of claim 12, wherein the core is loaded with a first cargo, wherein the first cargo is water-soluble.

14. The drug delivery complex of claim 12, wherein one or more additional cargoes are loaded in the lipid bilayers, and wherein the one or more additional cargoes are hydrophobic.

15. A multilayered vesicle formed by the method of claim 1.

16. The method of claim 1, wherein:
    the HCP-lipid complexes are produced by a method comprising mixing a hydrophobe containing polypeptoid (HCP) with a first set of unilamellar vesicles, thereby inserting pendant hydrophobe groups of the HCP into a lipid group of the first set of unilamellar vesicles and disrupting the first set of unilamellar vesicles to form the HCP-lipid complexes; and
    the dynamically free hydrophobe groups of the HCP-lipid complexes do not disrupt the unilamellar vesicles when bridging and fusing the unilamellar vesicles to form the multilayered vesicles.

17. The method of claim 1, wherein:
    the HCP-lipid complexes have an HCP:lipd ratio in a range of 1:20 to 20:1 (w/w); and the multilayered vesicles have a unilamellar vesicle: HCP-lipid complex ratio in a range of 1:20 to 10:1 (w/w).

18. The method of claim 1, wherein:
the HCP-lipid complexes have an HCP:lipd ratio in a range of 1:3 to 3:1 (w/w); and
the multilayered vesicles have a unilamellar vesicle: HCP-lipid complex ratio in a range of 1:3 to 2:1 (w/w).

19. The method of claim 1, wherein the hydrophobe containing polypeptoid comprises a polymer comprising backbone nitrogen atoms attached to a hydrophobic substituent selected from the group consisting of substituted or unsubstituted alkoxy, aryloxy, alkyl, alkenyl, alkynyl, aryl, arylalkyl, carbamate, carboxy, cycloalkyl, ester, ether, haloalkyl, heteroaryl, heterocyclyl, and ketone groups having from 6 to 30 carbon atoms.

20. The method of claim 1, wherein the multilayered vesicles comprise eight or more successive fused layers.

21. The method of claim 7, wherein:
the unilamellar vesicles are characterized by a first diameter ($D_1$);
the multilayered vesicles are characterized by a second diameter ($D_2$); and
at least one of condition (I) and condition (II) is satisfied:
(I) a difference $D_2-D_1$ is at least 50 nm; and
(II) a ratio $D_2/D_1$ is at least 1.5.

22. The method of claim 7, wherein:
the unilamellar vesicles are characterized by a first diameter ($D_1$) in a range of 100 nm to 1000 nm;
the multilayered vesicles are characterized by a second diameter ($D_2$); and
at least one of condition (I) and condition (II) is satisfied:
(I) a difference $D_2-D_1$ is at least 200 nm; and
(II) a ratio $D_2/D_1$ is at least 3.

23. The method of claim 7, wherein:
the unilamellar vesicles are characterized by a first diameter ($D_1$) in a range of 10 nm to 2500 nm;
the multilayered vesicles are characterized by a second diameter ($D_2$); and
at least one of condition (I) and condition (II) is satisfied:
(I) a difference $D_2-D_1$ is in a range of 200 nm to 900 nm; and
(II) a ratio $D_2/D_1$ is in a range of 2.5 to 10.

* * * * *